US010344843B2

(12) United States Patent
Hess

(10) Patent No.: US 10,344,843 B2
(45) Date of Patent: Jul. 9, 2019

(54) TORQUE CONVERTER BUSHING FOR ALIGNING BEARING BETWEEN TURBINE AND STATOR

(71) Applicant: Schaeffler Technologies AG & Co. KG, Herzogenaurach (DE)

(72) Inventor: Timothy Hess, Westlake, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 203 days.

(21) Appl. No.: 15/343,637

(22) Filed: Nov. 4, 2016

(65) Prior Publication Data

US 2018/0128360 A1 May 10, 2018

(51) Int. Cl.
*F16H 41/24* (2006.01)
*F16C 35/077* (2006.01)
*F16H 41/28* (2006.01)
*F16C 19/30* (2006.01)
*F16C 19/46* (2006.01)
*F16C 33/54* (2006.01)
*F16C 33/58* (2006.01)

(52) U.S. Cl.
CPC ........... *F16H 41/24* (2013.01); *F16C 35/077* (2013.01); *F16H 41/28* (2013.01); *F16C 19/305* (2013.01); *F16C 19/463* (2013.01); *F16C 33/545* (2013.01); *F16C 33/585* (2013.01); *F16C 2360/24* (2013.01); *F16H 2041/246* (2013.01)

(58) Field of Classification Search
CPC ................................................ F16H 2041/246
See application file for complete search history.

(56) References Cited

U.S. PATENT DOCUMENTS

| | | | |
|---|---|---|---|
| 5,175,999 A * | 1/1993 | Hara | F16H 41/30 415/175 |
| 7,802,668 B2 | 9/2010 | Peri et al. | |
| 7,938,243 B2 | 5/2011 | Avins et al. | |
| 8,453,439 B2 | 6/2013 | Peri | |
| 8,813,483 B2 * | 8/2014 | Maienschein | F16H 41/24 60/338 |

* cited by examiner

*Primary Examiner* — F Daniel Lopez
(74) *Attorney, Agent, or Firm* — Davidson, Davidson & Kappel, LLC

(57) ABSTRACT

A torque converter is provided. The torque converter includes a stator, a turbine, a bushing provided at an inner circumferential surface of the turbine and a thrust bearing provided axially between the turbine and the stator. The bushing contacts an inner circumferential surface of the thrust bearing for piloting the turbine bearing. A method of forming a torque converter is also provided. The method includes providing a bushing at an inner circumferential surface of a turbine; and providing a thrust bearing axially between the turbine and a stator such that the bushing contacts an inner circumferential surface of the thrust bearing to pilot the turbine bearing.

19 Claims, 2 Drawing Sheets

TORQUE CONVERTER BUSHING FOR ALIGNING BEARING BETWEEN TURBINE AND STATOR

The present disclosure relates generally to torque converters and more specifically to the aligning of a bearing between a turbine and a stator in a torque converter.

BACKGROUND

U.S. Pat. No. 7,802,668 discloses a stator side plate including tabs for centering a bearing. U.S. Pat. No. 8,453,439 also discloses an arrangement for centering a bearing on a stator side plate.

U.S. Pat. No. 7,938,243 discloses a thrust washer between the cover plate and flange. The thrust washer includes alignment tabs.

SUMMARY OF THE INVENTION

A torque converter is provided. The torque converter includes a stator, a turbine, a bushing provided at an inner circumferential surface of the turbine and a thrust bearing provided axially between the turbine and the stator. The bushing contacts an inner circumferential surface of the thrust bearing for piloting the turbine bearing.

A method of forming a torque converter is also provided. The method includes providing a bushing at an inner circumferential surface of a turbine; and providing a thrust bearing axially between the turbine and a stator such that the bushing contacts an inner circumferential surface of the thrust bearing to pilot the turbine bearing.

BRIEF DESCRIPTION OF THE DRAWINGS

The present invention is described below by reference to the following drawings, in which.

DETAILED DESCRIPTION

The disclosure provides a cost effective design for centering and retaining a roller bearing, especially a roller bearing axially between a turbine shell and a stator of a torque converter. A bushing at an inner diameter of the turbine shell is winged upward to support and center the turbine shell and to pilot the turbine bearing. The winged step may be continuous or formed by patterned features evenly circumferentially spaced from each other.

Figure 1:
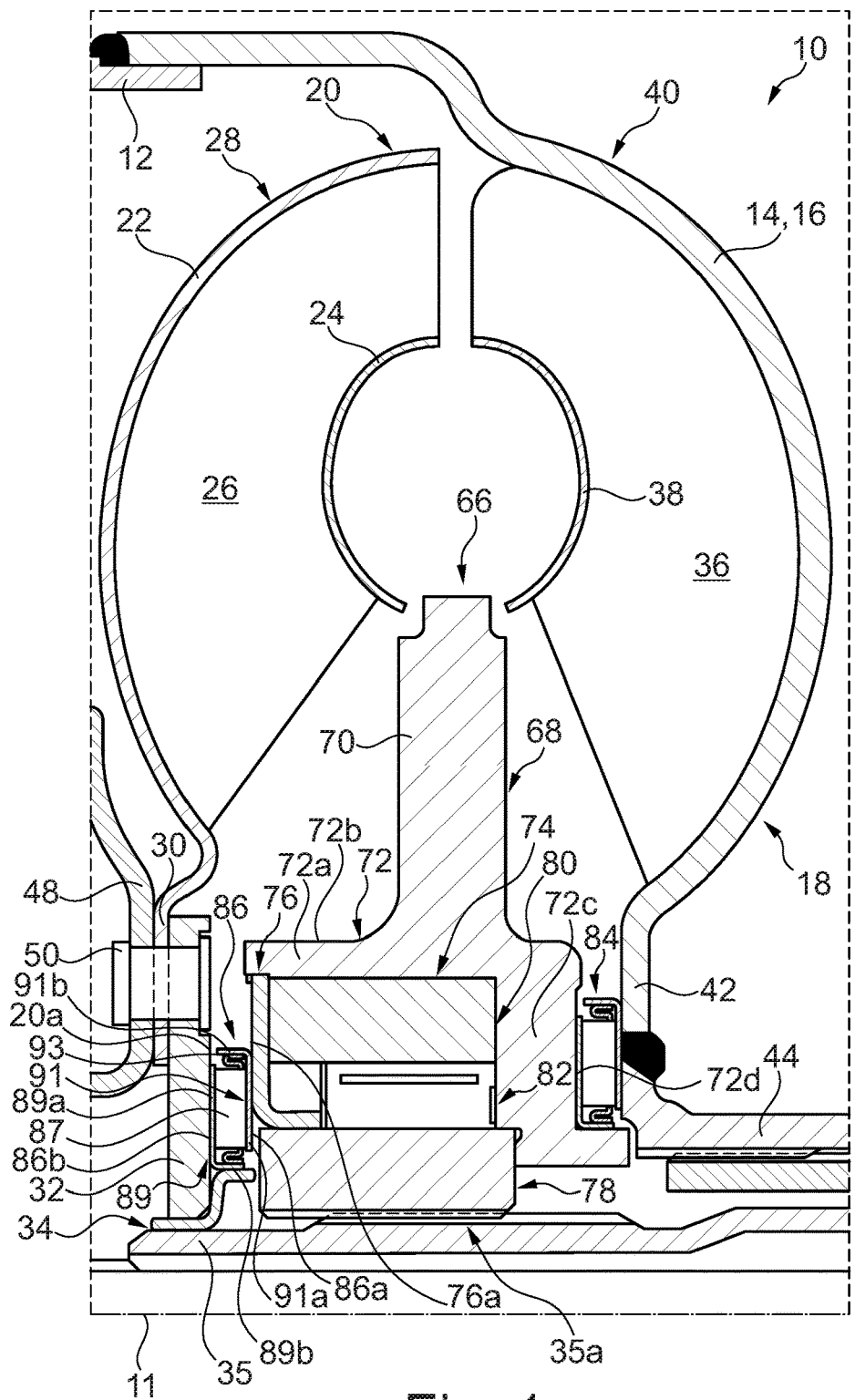
FIG. 1 shows a cross-sectional side view of a torque converter according to an embodiment of the present invention.

FIG. 1 shows a partial cross-sectional side view of a torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 including a turbine shell 22 and a core ring 24 supporting a plurality of turbine blades 26 therebetween. Blades 26 may be fixed at an engine side thereof to turbine shell 22 by tabs and may be each fixed to core ring 24 at a transmission side thereof by tabs.

Turbine shell 22 includes a rounded blade supporting portion 28, which is shaped as an annular bowl, for contacting engine side edges of turbine blades 26. Radially inside of blade supporting portion 28, turbine shell 22 includes an annular inner radial extension 30 that, at an inner radial end thereof, joins a support ring 32 of turbine 20, which is thicker than turbine shell 22 and whose inner circumferential surface defines a center bore of turbine 20, contacts an outer circumferential surface of a bushing 34 configured for piloting a stator shaft 35.

Impeller 18 includes impeller blades 36, which are each fixed at a transmission side thereof to impeller shell 16 and are each fixed to an impeller core ring 38 at an engine side thereof by tabs. Impeller shell 16 includes a rounded blade supporting portion 40, which is shaped as an annular bowl, for contacting transmission side edges of impeller blades 36. Radially inside of blade supporting portion 40, impeller shell 16 includes an annular inner radial extension 42 extending radially inward from blade supporting portion 40. A radially inner end of extension 42 is connected to an impeller hub 44.

A damper assembly, in a known manner, is positioned axially between a radially extending section front cover 12 and turbine 20 and is configured for transferring torque from turbine 20 to a transmission input shaft. The damper assembly includes a first or turbine side cover plate 48 connecting the damper assembly to turbine 20. Turbine shell 22, support ring 32 and cover plate 48 are riveted together by rivets 50 extending axially through each of turbine shell 22, support ring 32 and cover plate 48 to sandwich inner radial extension 30 of turbine shell 22 between support ring 32 and cover plate 48. The damper assembly may also include a further cover plate for supporting a plurality of circumferentially spaced springs with cover plate 48 and a drive flange provided with a hub configured for directly connecting to a transmission input shaft. The drive flange includes circumferentially spaced slots formed therein for receiving the springs such that during operation of torque converter 10, the cover plates transmit torque to the drive flange via the springs to drive the transmission input shaft. Torque converter 10 also includes a lockup clutch connected to the damper assembly configured for locking front cover 12 to turbine 20 via the damper assembly during operation of torque converter 10. The lockup clutch may include a clutch plate and piston that is axially slidable to force the clutch plate into a further surface to lock the lockup clutch.

Torque converter 10 also includes a stator 66 axially between turbine 20 and impeller 18 to redirect fluid flowing from the turbine blades 26 before the fluid reaches impeller 18 to increase the efficiency of torque converter 10. Stator 66 includes stator casting 68 including a plurality of blades 70 and a stator body 72. Stator body 72 includes an outer portion 72a formed as an axially extending ring supporting blades 70 on an outer circumferential surface 72b thereof and an inner portion 72c extending radially inward from outer portion 72a. Stator 66 also includes a one-way clutch 74 aligned within stator body 72 by a side plate 76. Side plate 76 extends radially along a turbine side of one-way clutch 74, inner portion 72c of stator body 72 extends radially along an impeller side of one-way clutch 74 and outer portion 72a of stator body 72 extends along an outer circumference of one-way clutch 74.

One-way clutch 74 includes an inner race 78, an outer race 80 and a known rollers/springs arrangement 82 radially between inner race 78 and outer race 80. An inner circumferential surface of inner race 78 is configured, for example by including splines, for non-rotatably fixing to an outer circumferential surface 35a of stator shaft 35. Stator casting 68 is rotationally fixed at outer portion 72a of stator body 72 to an outer circumferential surface of outer race 80 via an inner circumferential surface of outer portion 72a, and depending on the operating conditions of torque converter 10, in a known manner, inner race 78 and outer race 80 are rotationally fixed to each other by the rollers/springs arrangement 82 such that stator 66 rotates with stator shaft 35 or inner race 78 and outer race 80 are rotatable relative to each other. An outer circumferential surface of side plate 76 is held in an inner circumferential surface of outer portion 72a of stator body 72.

An impeller side axial thrust roller bearing 84 is positioned axially between stator 70 and impeller 18. More specifically, roller bearing 84 contacts a radially extending surface 72d of inner portion 72c of stator body 72 and contacts a radially extending surface of inner radial extension 42 of impeller shell 16.

A turbine side axial thrust roller bearing 86 is positioned axially between stator 70 and turbine 20. Thrust bearing 86 includes roller elements 87, which in this embodiment are needle rollers, axially between a radially extending section 89a of a first or turbine side race ring 89 and a radially extending section 91a of a second or stator side race ring 91. First race ring 89 and second race ring 91 also include respective axially extending collars 89b, 91b for supporting a roller cage 93 that supports roller elements 87.

A first radially extending surface 86a of roller bearing 86, more specifically of radially extending section 91a of second race ring 91, contacts a radially extending surface 76a of side plate 76 and a second radially extending surface 86b of roller bearing 86, more specifically of radially extending section 89a of first race ring 89, contacts a radially extending surface 20a of turbine 20, which is specifically a part of support ring 32 in this embodiment. In another embodiment, support ring 32 may be omitted and turbine shell 22 may extend further radially inward to directly contact bushing 34, such that radially extending surface 20a contacting surface 86b is a part of turbine shell 22.

Figure 2:
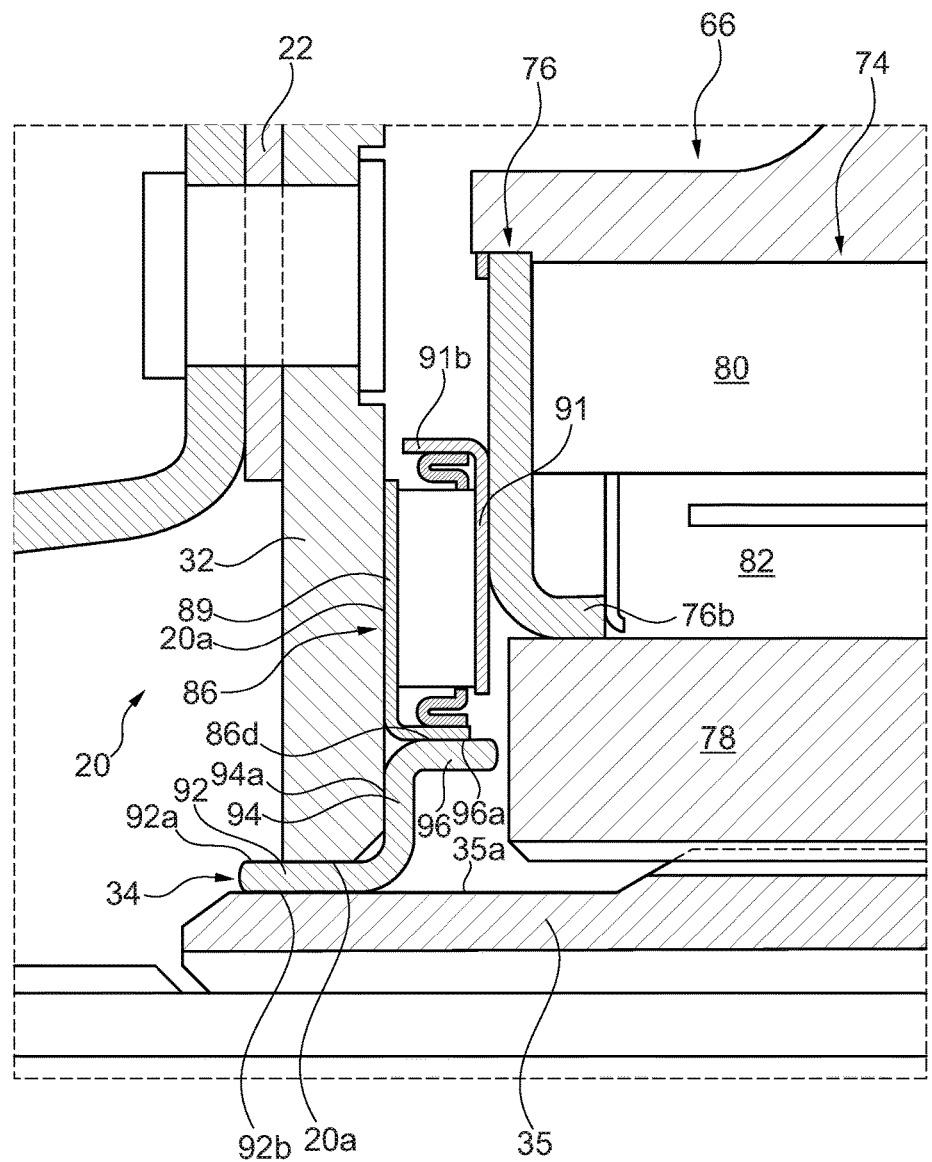
FIG. 2 shows an enlarged view a portion of the torque converter shown in FIG. 1 illustrating the positioning of a thrust roller bearing between a turbine and a stator.

FIG. 2 shows an enlarged view of the positioning of thrust roller bearing 86 between turbine 20 and stator 66 in accordance with an embodiment of the present invention. Side plate 76 includes a rear side axially extending flange 76b protruding into one-way clutch 74. Rear side axially extending flange 76b forms an inner circumferential surface of side plate 76 and extends along an outer circumferential surface of inner race 78 for aligning rollers/spring arrangement 82.

Bushing 34 is ring shaped and is configured for contacting an inner circumferential surface 86d, more specifically of radially extending section 89b of first race ring 89, to pilot thrust roller bearing 86. Bushing 34 includes an inner axially extending section 92, a radially extending section 94 extending radially outward from inner axially extending section 92 and an outer axially extending section 96 extending axially from an outer end of radially extending section 94. Inner axially extending section 92 is provided at the center bore of turbine 20 such than an outer circumferential surface 92a of section 92 is in contact with the innermost circumferential surface 20a of turbine 20, as defined the inner circumferential surface of support ring 32, and an inner circumferential surface 92b of section 92 is in contact with an outer circumferential surface 35a of stator shaft 35. Radially extending section 94 extends radially along a portion of support ring 32 such that a radially extending surface 94a of section 94 contacts radially extending surface 20a. Outer axially extending section 96 then extends axially away from surface 20a with an outer circumferential surface 96a of section 96 contacting inner circumferential surface 86d of thrust roller bearing 86. Accordingly, thrust roller bearing 86 is centered and retained so as to prevent thrust roller bearing 86 from moving radially by bushing 35.

In this embodiment, outer axially extending section 96 is formed of a plurality of axially extending circumferentially spaced tabs; however, in other embodiments, outer axially extending section 96 may be formed as a continuous ring.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a stator;
   a turbine;
   a bushing provided at an inner circumferential surface of the turbine; and
   a thrust bearing provided axially between the turbine and the stator, the bushing contacting an inner circumferential surface of the thrust bearing for piloting the thrust bearing, the bushing including an inner axially extending section having an outer circumferential surface contacting the inner circumferential surface of the turbine,
   wherein the inner axially extending section has an inner circumferential surface configured for contacting an outer circumferential surface of a stator shaft.

2. The torque converter as recited in claim 1 wherein the bushing further includes an outer axially extending section contacting the inner circumferential surface of the thrust bearing and a radially extending section extending from the inner axially extending section to the outer axially extending section, the radially extending section contacting a radially extending surface of the turbine.

3. The torque converter as recited in claim 1 wherein the thrust bearing includes a first race ring having a first radially extending section that contacts the turbine, the thrust bearing including a second race ring having a second radially extending section that contacts the stator.

4. The torque converter as recited in claim 3 wherein the thrust bearing includes rollers axially between the first and second radially extending sections.

5. The torque converter as recited in claim 3 wherein one of the first race ring and the second race ring includes an axially extending collar contacting an outer circumferential surface of the bushing.

6. The torque converter as recited in claim 1 wherein the stator includes a side plate contacting the thrust bearing, a stator casting and a one-way clutch, the side plate aligning the one-way clutch in the stator casting.

7. A method of forming a torque converter comprising:
   providing a bushing at an inner circumferential surface of a turbine; and
   providing a thrust bearing axially between the turbine and a stator such that the bushing contacts an inner circumferential surface of the thrust bearing to pilot the thrust bearing, the bushing including an inner axially extending section having an inner circumferential surface configured for contacting an outer circumferential surface of a stator shaft.

8. The method as recited in claim 7 wherein the inner axially extending section has an outer circumferential surface contacting the inner circumferential surface of the turbine.

9. The method as recited in claim 8 wherein the bushing further includes an outer axially extending section contacting the inner circumferential surface of the thrust bearing and a radially extending section extending from the inner axially extending section to the outer axially extending section, the radially extending section contacting a radially extending surface of the turbine.

10. The method as recited in claim 9 wherein the stator includes a side plate contacting the thrust bearing, a stator casting and a one-way clutch, the side plate aligning the one-way clutch in the stator casting.

11. The method as recited in claim 7 wherein the thrust bearing includes a first race ring having a first radially extending section that contacts the turbine, the thrust bearing including a second race ring having a second radially extending section that contacts the turbine.

12. The method as recited in claim 1 wherein the thrust bearing includes rollers axially between the first and second radially extending sections.

13. The method as recited in claim 11 wherein one of the first race ring and the second race ring includes an axially extending collar contacting an outer circumferential surface of the bushing.

14. A torque converter comprising:
a stator;
a turbine;
a bushing provided at an inner circumferential surface of the turbine; and
a thrust bearing provided axially between the turbine and the stator, the bushing contacting an inner circumferential surface of the thrust bearing for piloting the thrust bearing, the turbine including a turbine shell including an annular inner radial extension joined to a support ring of the turbine, the support ring being thicker than the turbine shell and being axially between the annular inner radial extension and the thrust bearing,
wherein the bushing includes an inner axially extending section having an inner circumferential surface configured for contacting an outer circumferential surface of a stator shaft.

15. The torque converter as recited in claim 14 wherein the bushing contacts an inner circumferential surface of the support ring.

16. The torque converter as recited in claim 14 wherein the thrust bearing contacts a radially extending surface of the support ring.

17. The torque converter as recited in claim 14 wherein the support ring and the annular inner radial extension are fixed to a damper assembly cover plate.

18. The torque converter as recited in claim 17 wherein the annular inner radial extension is axially between the support ring and the damper assembly cover plate.

19. The torque converter as recited in claim 18 wherein the annular inner radial extension, the support ring and the damper assembly cover plate are fixed together by a rivet extending through the annular inner radial extension, the support ring and the damper assembly cover plate.

* * * * *